Sept. 23, 1930. F. P. LIVINGSTON 1,776,288
AUTOMOTIVE BRAKE
Filed Feb. 18, 1926
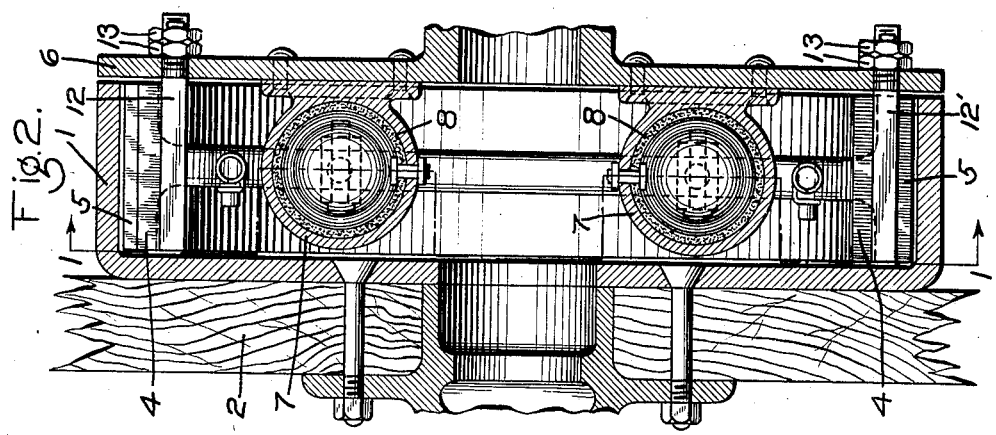
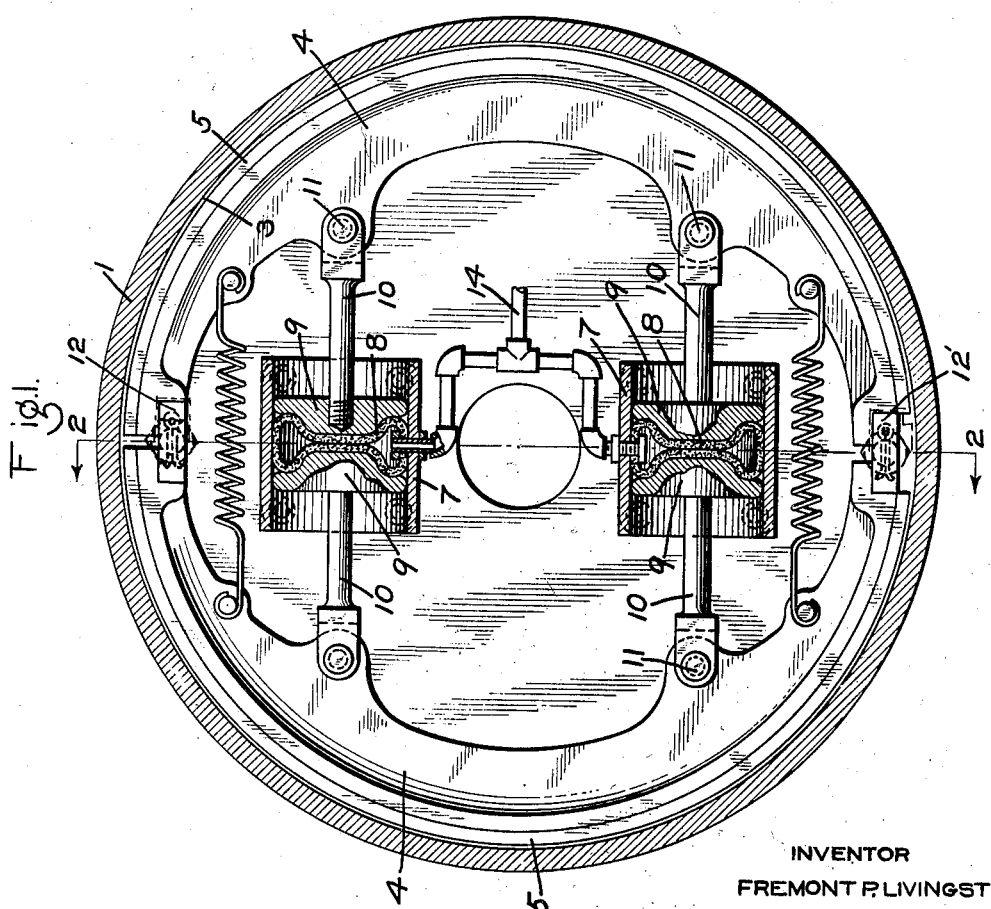
INVENTOR
FREMONT P. LIVINGSTON
BY *Wm. M. Cady*
ATTORNEY Patented Sept. 23, 1930

1,776,288

UNITED STATES PATENT OFFICE

FREMONT P. LIVINGSTON, OF DENVER, COLORADO, ASSIGNOR TO THE WESTINGHOUSE AIR BRAKE COMPANY, OF WILMERDING, PENNSYLVANIA, A CORPORATION OF PENNSYLVANIA

AUTOMOTIVE BRAKE

Application filed February 18, 1926. Serial No. 89,102.

This invention relates to brakes of the internal expanding drum type, such as are employed on motor vehicles, and the principal object of my invention is to provide an improved fluid pressure operated brake of the above type.

In the accompanying drawing; Fig. 1 is a section on the line 1—1 of Fig. 2, of an internal expanding drum brake embodying my invention; and Fig. 2 a section on the line 2—2 of Fig. 1.

The construction shown in the drawing comprises a brake drum 1 secured to a vehicle wheel 2 and having an internal friction face 3 and mounted within said drum are two oppositely disposed brake heads 4. Said brake heads are each provided with a brake shoe 5 which is provided with an arcuate friction face adapted to engage the friction face 3 of the brake drum 1.

Secured to the usual drum cover plate 6 at opposite sides of the drum axis are open ended cylinders 7, each containing a double walled flexible diaphragm 8 of rubber or other flexible material in the form of a collapsible bag having side walls which are adapted to expand when fluid under pressure is supplied to the chambers intermediate the side walls.

A pressure plate 9 engages each of the side walls of the diaphragm 8 and secured to each plate is a rod 10 which is pivotally connected to the adjacent brake head 4 by a pin 11.

Intermediate the adjacent upper and lower ends of the brake heads 4 are disposed members 12 and 12' which are preferably rectangular in cross section and which are each provided with a round section at one end which extends through an aperture in the cover plate 6, said members being secured to the cover plate by means of nuts 13.

The ends of the brake heads 4 are notched out to receive the members 12 and 12', so that each member acts as a guide to permit a sliding movement of the brake head in a radial direction. Said members also serve as stops to prevent rotative movement of the brake heads relative to the brake drum and further to limit the release movement of the heads.

In operation, the brakes may be applied by supplying fluid under pressure through a pipe 14 to the chamber within the diaphragm 8 and thereby the side walls of the diaphragm are expanded, causing an outward movement of the pressure plates 9. The brake heads 4 are thus moved radially outward, so that the brake shoes 5 frictionally engage the friction face 3 of the brake drum 1. In this movement, the brake heads are guided by the members 12, which also prevent rotative movement of the brake heads.

To release the brakes, fluid under pressure is released through pipe 14 from the brake chamber, and thereupon the release springs 15, which connect the opposite brake heads, operate to shift the brake heads to release position, the members 12 acting as stops to limit the release movement.

Having now described my invention, what I claim as new and desire to secure by Letters Patent, is:—

In a pressure responsive device, an open ended cylinder, a flexible bag mounted in said cylinder, having a cylindrical wall engaging the interior cylindrical face of said cylinder and opposing cup-shaped walls disposed transversely of the cylinder, follower plates contoured to engage said cup-shaped walls, and pressure transmitting members connected to said follower plates.

In testimony whereof I have hereunto set my hand.

FREMONT P. LIVINGSTON.